Patented Aug. 1, 1939

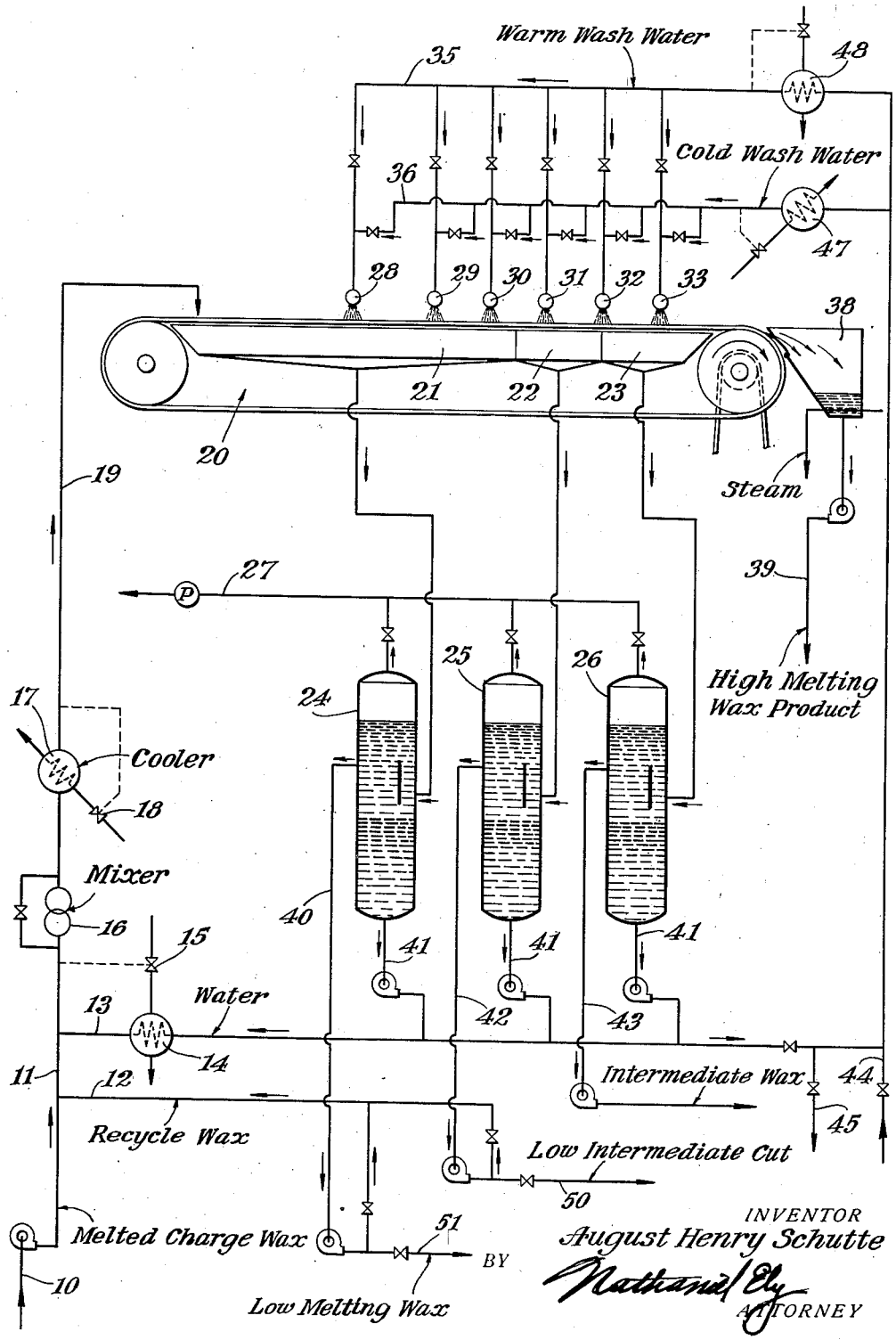

2,168,142

UNITED STATES PATENT OFFICE 2,168,142

METHOD OF SEPARATING WAX

August Henry Schutte, Westfield, N. J.

Application May 19, 1938, Serial No. 208,911

9 Claims. (Cl. 196—20)

This invention relates to improvements in the method of obtaining particular melting point waxes from a charge of mixed melting point waxes and is a modification of the principles set forth in my co-pending application, Serial No. 192,534, filed February 25, 1938, and as carried forward in my co-pending application, Serial No. 232,623, filed September 29, 1938.

The principal object of the invention is to provide an improved method for continuously obtaining various melting point waxes with a sharp separation obtained between the respective cuts by a continuous filtration at progressively increasing temperatures of the wax in a porous, readily filterable mass.

Another object of the invention is to provide a continuous method of separating wax fractions from a slack wax or a crude scale wax, which is particularly characterized by low initial and operating cost, a short time cycle, and a recycle of low melting point cuts without intermediate storage, and with a reduction of pumps and transfer equipment normally required.

A further object of the invention is to greatly simplify the separation of the wax fractions from the wax charge with a material reduction in the amount of utilities required and with substantial economy in apparatus.

Further objects and advantages of this invention will appear from the following description of a preferred form of embodiment thereof taken in connection with the attached drawing which is illustrative of said embodiment and shows a flow diagram for such process.

The melted wax charged at 10 in accordance with my invention, is a typical slack wax or a mixture of various melting point waxes with oil which has been heated so that it can be pumped through the line 11. Under normal operation, this fresh charge wax is mixed with recycle wax at 12. In accordance with my invention, this wax is then mixed with water or suitable non-solvent liquid at 13 which has been suitably heated in the heat exchanger 14. The temperature of the mixture of wax and non-solvent liquid in the line 11 is under control of the temperature control 15 so that substantially all of the wax remains liquid.

The mixture of wax and water is then passed through the mixing device 16 which may be of any desired type but which is primarily adapted to make an intimate mix of the oil and water in the nature of an emulsion. Inasmuch as this mixture is immediately treated, a technical emulsion is not required although it is desirable that the materials be so agitated or otherwise intermixed that they will be freely filtered as hereinafter described. The emulsion possesses sufficient stability and has a large interfacial area between the non-solvent and the wax. The mixture is then preferably cooled in a cooler 17, the temperature of which is controlled by a temperature controller 18 operating in the cold mixture line 19 prior to the mixture being applied to the filter 20. The mixture is cooled down until all but the low melting point waxes are solid. It becomes a porous, readily filterable mass.

The filter 20 may be of any general type of pressure, centrifugal or vacuum filter and of the disc or drum type, but is preferably of the Fourdrinier type and is conveniently provided with a plurality of suction boxes 21, 22 and 23. The liquid mixture of molten low melting point waxes and water passes through the filter medium under influence of a pressure differential established in the suction boxes 21, 22 and 23, which are connected to the knock-out drums 24, 25 and 26 respectively. Each of these knock-out drums is separately connected with a vacuum discharge line 27 which maintains independent vacuums on the respective suction boxes.

Above the filter surface are a plurality of wash nozzles 28, 29, 30, 31, 32 and 33, and each of these is independently connected with both a warm wash line 35 and a cold wash line 36 so that the temperature of the wash at the respective nozzles can be precisely adjusted. Normally the first nozzle 28 has the lowest wash temperature and the nozzle 33 has the highest wash temperature so that increasing melting point waxes are melted to pass continuously through the filter cloth. The use of water as a wash liquid is preferable as it is immiscible in the wax and will separate readily. The water penetrates the porous wax mass and makes a quick temperature equilibrium possible. The highest melting point wax is discharged into the hopper 38 which may be provided with a suitable heating coil to melt the wax so it may be discharged at 39 for storage or further treatment.

As many suction boxes as may be desired can be used and normally as many boxes are used as there are cuts of wax. For example, the first filtrate collected in suction box 21, which is drawn into the knock-out drum 24, includes the oily lowest melting point waxes and water which readily separate and are then removed in the lines 40 and 41 respectively.

In the second suction box 22, a low intermediate cut of wax and water is removed due to the influence of the higher temperature wash. This cut of wax and water is then drawn into knock-out drum 25, similarly settled, and the wax is removed at 42. The water is again removed into line 41.

In the third knock-out drum 26, the filtrate drawn from suction box 23 is a high intermediate melting point wax and water which separates so that the intermediate wax is removed at 43 with the water removed at 41. All of these water lines are interconnected to supply the original water requirements at 13 and to supply the wash water lines 35 and 36. These wash water lines are separately passed through a cooler 47 and a heater 48 to precisely control the water temperature for the wash lines. Make-up water is supplied in the line 44 and if an excess is present, it can be removed at 45.

I find that the free filtering of the wax at the different temperatures greatly exceeds expectations and this is undoubtedly due to the emulsion with water which is a non-solvent for the wax. No dilution is necessary and the wax, due to the intimate mixing, becomes so finely divided and with such a thin film on the filter surface, that temperature equilibrium can be quickly established. Furthermore, the filter cake is a porous mass, and easily washed so that the filtration can be continuous and continuous cuts of different melting point waxes be removed. The temperature gradient of the wash liquid can be easily controlled to accomplish this purpose. In the separation of crude scale wax from a commercial slack wax, the total filtering time from the feed to the cake end of the filter was only 72 seconds. The filtration rate increases as the warmer washes are applied and a reduced vacuum may be employed for the final stages.

This method of separating wax is particularly characterized not only by its continuity, but by the inexpensive utilities required. All temperatures are within the normal range of exhaust steam and cooling water. No steam heated intermediate storage is required, and no pumps are required to transfer the wax from one point to another for separation. Although water is suggested as the principal material for facilitating filtration, it is of course to be understood that other materials may be used such as brine, and lower alcohols, but water is by far the cheapest and there appears to be no economy in using other materials.

In the non-solvent emulsion the wax is in finely divided particles which cannot agglomerate, due to the presence of the non-oily material. The formation of a dense wax crystal structure is prevented and the filtration of the oil and low melting point waxes is thus greatly accelerated. Since each particle was surrounded by non-solvent in the original emulsion, the subsequent washing with warm non-solvent for melting and displacing the lower melting constituents is readily effected at high filter rates. The presence of the wax in fine particles assures rapid and uniform temperature equilibrium with the wash liquid.

As an example of the operation of this apparatus, if the charge is a commercial slack wax of 104° F. melting point, it is possible to obtain 33% or more of 120° F. melting point wax with the other fractions accounting for the balance. In such case, the temperature of the wash water nozzles will be approximately in the range of 90°–100°–120° F. The high melting point wax will be the 124° F. melting point crude scale wax. These temperatures, however, are merely indicative of one set of operating conditions and are not to be deemed to limit the invention in any way.

The end products will vary as desired, but it is usual to consider the higher melting point wax removed at 39 to be an end product. The same is generally true of the intermediate melting point wax removed at 43. The lower melting point waxes are usually recycled as by line 12 to give an additional yield although a proportion of low intermediate melting point wax and the low melting point wax are usually removed at 50 and 51 respectively.

While I have shown and described a preferred form of embodiment of my invention, I am aware that modifications may be made thereto and I therefore desire a broad interpretation of my invention within the scope and spirit of the description herein and of the claims appended hereinafter.

I claim:

1. The method of separating specified melting point waxes from a mixture of various melting point waxes, which comprises the steps of intimately mixing the wax mixture with a non-solvent liquid and forming a fine dispersion having a large interfacial area between the non-solvent and the wax, and thereafter cooling, while maintaining the wax mixture in the dispersed form to precipitate substantially all but the low melting point wax and continuously removing liquid waxes by contact with wash liquids at successively increasing temperatures compatible with the desired melting points.

2. The method of separating specified melting point waxes from a mixture of various melting point waxes, which comprises the steps of intimately mixing the wax with a non-solvent liquid and forming an emulsion of finely dispersed wax, cooling the emulsion to precipitate substantially all but the low melting point wax, continuously filtering the emulsion, and washing the wax cake with successive applications of the non-solvent at controlled temperatures.

3. The method of separating specified melting point waxes from a mixture of various melting point waxes, which comprises the steps of intimately mixing the wax with a non-solvent liquid to form an emulsion therewith, cooling the emulsion to precipitate substantially all of the wax, continuously filtering the wax at a pressure differential and at progressively increasing temperatures, removing the filtrate at the respective temperature increases, and separating the non-solvent from the desired melting point waxes.

4. The method of separating specified melting point waxes from a mixture of various melting point waxes, which comprises the steps of emulsifying the wax mixture with a non-solvent liquid, cooling said emulsified mixture to precipitate a suitable portion of the wax, continuously filtering said mixture in the presence of progressively increasing temperature wash liquids and separately collecting the filtrates adjacent the respective washes whereby waxes of different melting points will be separately obtained.

5. The method of separating specified melting point waxes from a mixture of various melting point waxes, which comprises the steps of emulsifying the wax mixture with a non-solvent liquid, cooling said emulsified mixture to precipitate substantially all of the wax, continuously filtering said mixture in the presence of progressively increasing temperature wash liquids, separately collecting the filtrates adjacent the respective washes whereby waxes of different melting points will be separately obtained and recycling a part of the low melting point waxes.

6. The method of obtaining separate waxes of different melting points from a wax or wax-oil mixture which comprises emulsifying the wax mixture with water and chilling said emulsion to precipitate a porous filterable waxy mass, filtering said mass at progressively increasing temperatures and collecting separate filtrates containing different melting point waxes.

7. The method of obtaining separate waxes of different melting points from a wax mixture which comprises emulsifying the wax mixture with water and chilling said emulsion to precipitate a finely dispersed filterable mass, filtering said mass with application of progressively increasing temperature wash liquids at a rate at which temperature equilibrium is substantially reached, collecting separate filtrates containing the different melting point waxes and removing the filter cake as the highest melting point wax product.

8. The method of obtaining separate waxes of different melting points from a wax mixture which comprises emulsifying the wax mixture with water and chilling said emulsion to precipitate a porous filterable waxy mass, filtering said mass with application of progressively increasing temperature wash liquids at a rate at which temperature equilibrium is substantially reached, collecting separate filtrates containing the different melting point waxes, removing the filter cake as the highest melting point wax product and recycling the low melting point waxes to obtain a greater yield of higher melting point waxes.

9. A method of separating desired melting point waxes from a mixture of various melting point waxes or waxes and oils which include the steps of producing an emulsion of the various melting point waxes or waxes and oils with a liquid which is a non-solvent for and immiscible in the wax mixture, reducing the temperature of the emulsion produced to change the desired waxes to a solid phase while leaving the undesired waxes in filterable form, and filtering out the undesired waxes from the emulsion at a temperature at which the desired waxes exist in the solid phase and while maintaining the emulsified condition.

AUGUST HENRY SCHUTTE.